(12) United States Patent
Prox

(10) Patent No.: US 6,290,153 B1
(45) Date of Patent: Sep. 18, 2001

(54) GLASS BOTTLE DECASING AND RECOVERY

(75) Inventor: Jonathan P. Prox, Richland, PA (US)

(73) Assignee: Terex Corporation, Myerstown, PA (US)

( * ) Notice: Subject to any disclaimer, the term of this patent is extended or adjusted under 35 U.S.C. 154(b) by 0 days.

(21) Appl. No.: 09/361,242

(22) Filed: Jul. 27, 1999

Related U.S. Application Data

(60) Provisional application No. 60/094,254, filed on Jul. 27, 1998.

(51) Int. Cl.[7] .................................................. B02C 19/14
(52) U.S. Cl. .................................. 241/24.19; 241/24.22; 241/99
(58) Field of Search .............................. 241/24.19, 24.22, 241/24.3, 74, 99; 209/3, 664

(56) References Cited

U.S. PATENT DOCUMENTS

| | | |
|---|---|---|
| 3,946,953 | 3/1976 | Hato . |
| 4,018,675 | * 4/1977 | Petrucci ............................. 209/664 |
| 4,069,979 | 1/1978 | Morita et al. . |
| 4,178,232 | * 12/1979 | Nollet .................................... 209/3 |
| 4,795,103 | 1/1989 | Lech . |

* cited by examiner

*Primary Examiner*—Mark Rosenbaum
(74) *Attorney, Agent, or Firm*—James Creighton Wray; Meera P. Narasimhan

(57) ABSTRACT

A bottle decasing, breaking and separating system and method has a hopper feeder for receiving bottles and cases. The bottles and cases are supplied to a trommel by a conveyor beneath the feeder. A conveyor communicating with the trommel receives the separated and fragmented material. A chute connected to the conveyor transports the fragmented material. Lifting tubes in the trommel are for lifting, tipping and tumbling the cases and the bottles in the trommel when it rotates. Strong screens in the trommel fragment and remove the bottles tumbling in the trommel. The cases remain at upper levels above the fragmented material in the trommel. The trommel may be a drum which slopes downward and rearward from the forward to the rearward ends. A trough below the trommel receives the fragmented material from the trommel and supplies the material to a conveyor. An extension communicating with the conveyor for supplies the fragmented material from the conveyor to recycling bins. The extension may be pivotably connected to the conveyor for moving the extension along various points to fill several of the transport receptacles. The boxes separated from the bottles may be of pasteboard and cardboard or the like. An overs stacker conveyor towards the rear end of the trommel receives and transports the boxes to a compressor for compacting the boxes. The system is self-supporting, portable and transportable to any location. The chute may be telescopic for holding the conveyor closer to the system for transportation.

18 Claims, 2 Drawing Sheets

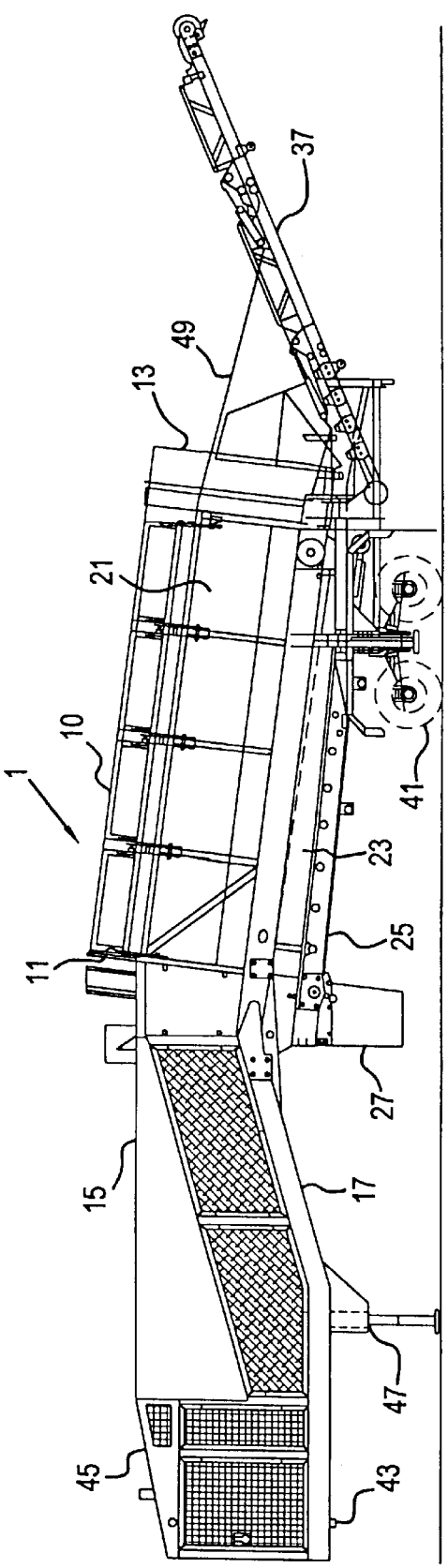
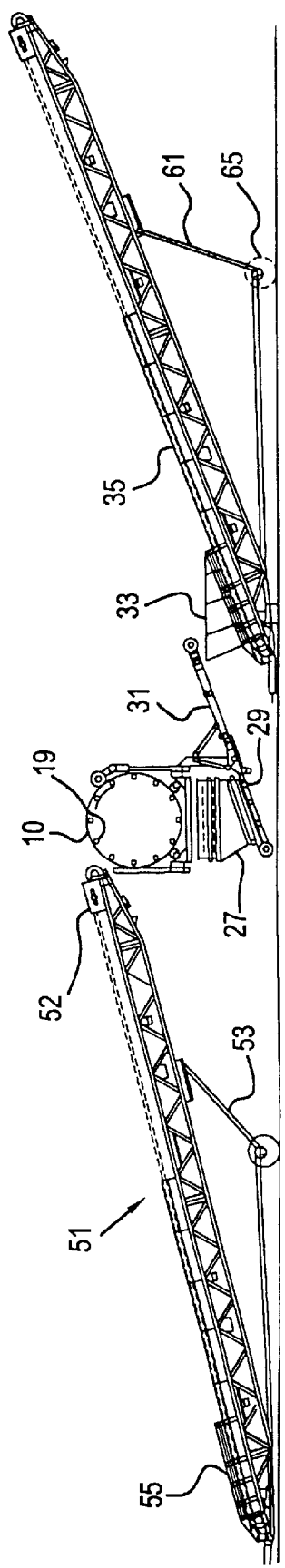

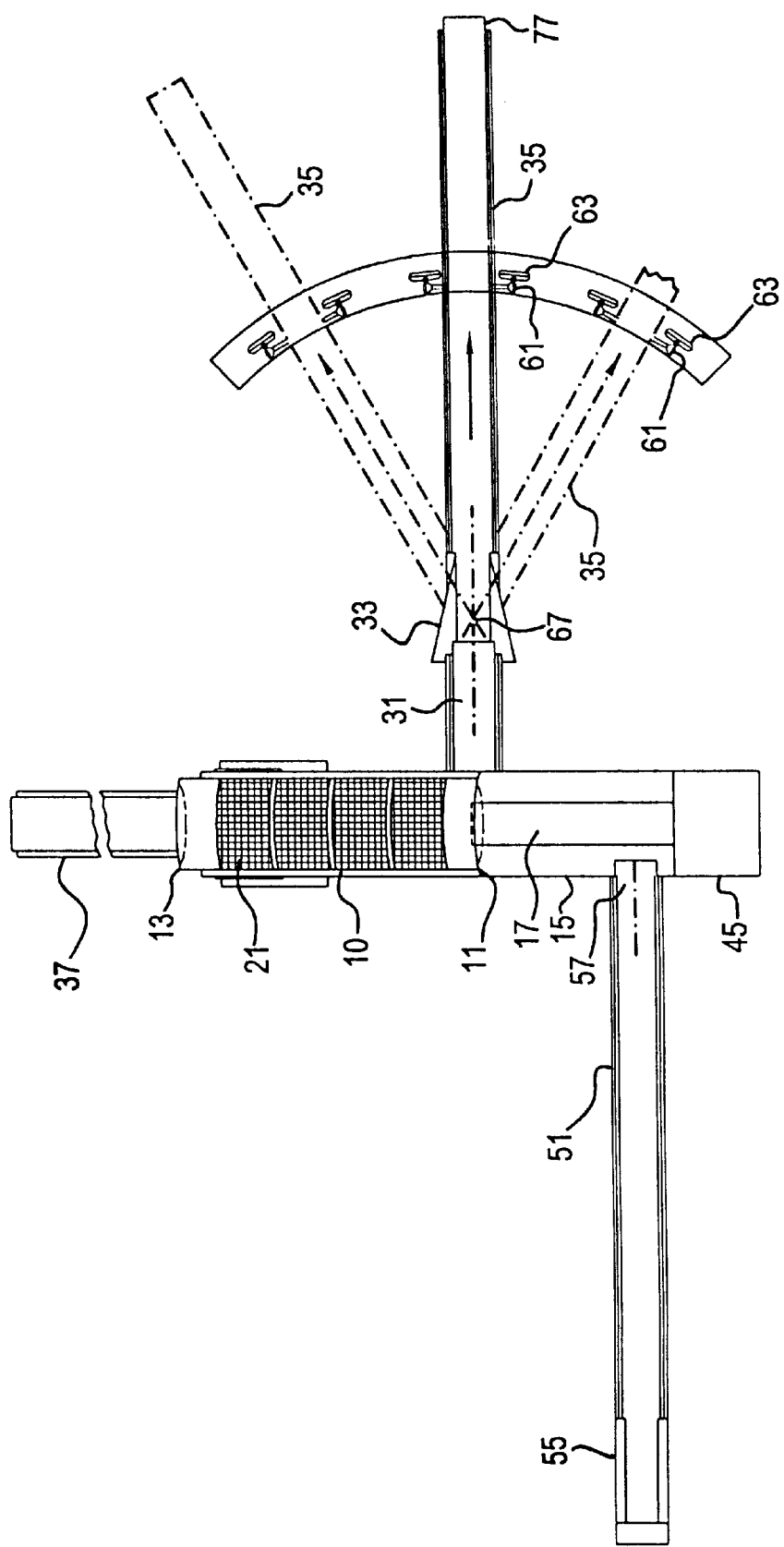

GLASS BOTTLE DECASING AND RECOVERY

This application claims the benefit of U.S. Provisional Application No. 60/094,254, filed Jul. 27, 1998.

BACKGROUND OF THE INVENTION

It is a labor intensive and a time consuming task to manually extract glass bottles from their cardboard cases and then introduce the bottles to a second piece of equipment to grind or break the glass for further recycling processes.

There is a large and immediate need in the beverage distribution industry to reduce hand labor and time in emptying cases of returned bottles and in preparing the bottles for recycling. Robotic machines for opening and emptying cases are not suitable.

SUMMARY OF THE INVENTION

The invention solves the case emptying and glass bottle recycling by using equipment which is new and unique in the beverage distributor industry.

This invention provides the use of trommels in recycling cased empty bottles of beer and other beverages. Trommel screens are used in decasing and processing beverage bottles for recycling.

A trommel is a generally horizontally mounted slightly downwardly and rearwardly sloped rotating screened drum. The invention provides a trommel that receives cased glass bottles for the purpose of decasing, breaking the bottles into fines, and separating the cardboard cases from the dumped bottles and ground (broken) glass. The trommel drums are created as a structural framework, then dressed with a heavy duty woven wire screen cloth with high strength bolt fasteners. The screen cloth is typically steel with a 0.192 wire size or larger, pre-rolled to conform to the framework. Various screen opening sizes are selected by the end user to produce the desired end product. In this case the openings are selected to match the desired size of the broken glass pieces.

The invention solves the existing problems by introducing a trommel into the decasing and bottle breaking process. In lieu of a manual process or expensive robotics to pull bottles from their cases, full cases are placed on a feed conveyor which in turn loads the feed hopper of the trommel. The trommel lifts and tumbles the full cases through the employment of lifting tubes, which are longitudinally extending parts of the rotating drum framework. The lifting tubes tip and tumble the cases repeatedly, thus extracting and dumping the bottles from the cases and breaking bottles against the screens, the lifting tubes and the trommel internal framework. The bottles and broken bottles are lifted, tumbled and dropped within the trommel until the glass pieces are reduced in size. Broken glass particles then pass through the screen cloth, which is the cylindrical surface of the trommel. Conveyors move the broken glass to stock piles or glass bins or containers. Empty cardboard cases are carried through the trommel drum to its discharge end onto a stacking conveyor, which feeds a cardboard compactor/baler. Trommel screen openings may be of sufficient size to pass unbroken or partially broken bottles, but it is preferable to reduce glass to sizes which permit compact shipping by truck or rail to glass plants and which provide the most economically advantageous pre-processing sizes.

Trommel screens have been tested and have proven successful in the case emptying and glass-cardboard separation for recycling application.

These and further and other objects and features of the invention are apparent in the disclosure, which includes the above and ongoing written specification, with the claims and the drawings.

BRIEF DESCRIPTION OF THE DRAWINGS

FIG. 1 is a side elevation of a trommel screen bottle decasing and separating recycler.

FIG. 2 is a top view of the recycler shown in FIG. 1.

FIG. 3 is an end elevation of the recycler shown in FIGS. 1 and 2.

DETAILED DESCRIPTION OF THE PREFERRED EMBODIMENTS

Referring to the drawings, a bottle decasing, breaking and separating trommel drum system is generally indicated by the numeral 1. Trommel drum 10 slopes downward and rearward from a forward, upper end 11 to a rearward, lower end 13.

In this embodiment cases of beer bottles for recycling are conveyed into feed hopper 15 and are moved by a conveyor 17 in the bottom of the feed hopper through the open upper end 11 of the trommel. As the trommel rotates, lifting tubes 19 (FIG. 3) lift, tip and tumble the pasteboard cases and bottles. The bottles fall out of the tipped cases by gravity, and the bottles and cases fall against insides of the heavy screens 21 and against internal framework of the trommel. The bottles fall out of the cases by gravity and break against the screens, lifting tubes and internal framework of the trommel. The lifting tubes continue to lift the bottles and empty cases as gravity moves the bottles and broken pieces below the cases, and the cases move above the glass toward the rearward end 13 of the trommel 10. Fragments of the bottles fall through the screens 21 into a trough 23 beneath the trommel. A conveyor 25 at the bottom of the trough moves the bottle fragments upward and forward to chute 27. There the bottle fragments fall to a conveyor 29 at the bottom of the chute. The bottle fragments are moved along the conveyor 29 (FIG. 3) and an extension 31 on conveyor 29, and fall into a hopper 33 at the bottom of a glass fragment stacker conveyor 35, as shown in FIGS. 2 and 3.

The lighter pasteboard containers from which the bottles and glass have fallen and have been removed move through the lower end 13 of the trommel. Several rotations and lifting and dropping of the cardboard containers as the containers pass through the trommel ensure that all bottles and glass are removed from the containers. The light cardboard boxes fall onto overs stacker conveyor 37 at the lower end 13 of the trommel for movement to a compression device, which flattens the pasteboard containers for reuse. If there are dividers or internal packaging such as six-pack bottle carriers in the containers, their tumbling and movement through the trommel causes bottles and glass to fall from those carriers. The cardboard passes with the pasteboard containers through the open lower end of the trommel 13 onto the overs stacker conveyor 37 for compression with the pasteboard.

The main system 1 may be a permanently installed system or, alternatively as shown in FIG. 1, the trommel 10, the feed hopper 15 and the conveyors 17, 25 and 37 may be assembled on a trailer chassis for movement along highways. In that case, a rear wheel assembly 41 is mounted beneath the trommel frame. A kingpin 43 is mounted beneath the diesel engine compartment 45, which provides power to rotate the trommel drum 10 and to move the conveyors 17, 25 and 37. A stand 47 is provided beneath the hopper 15 to support the unit when the kingpin 43 is disconnected from a fifth wheel of a tractor. The chute 27 telescopes, so that the conveyor 29 may be drawn up close to the top of the conveyor 25 for travel. The overs stacker 37 is supported on rods or cables 49 in use and is hinged so that it folds upward and over the trommel for transportation.

As shown in FIGS. 2 and 3, a stacker feed conveyor 51 has a driver 52 and self-supporting frame members 53. Cases of returned bottles are placed on the lower end 55 of the stacker feed conveyor 51. The cases may be fed to the feed conveyor 51 by portable gravity-type roller conveyors which are connected to returning trucks. The cases are moved upward along the feed conveyor and slide into the top of the hopper 15. The sloping walls of the hopper guide the cases to a moving belt 17 at the bottom of the hopper. Belt 17 carries the cases and any bottles which may have fallen from the cases into the upper end 11 of the rotating trommel drum 10.

The cases slide into the trommel and are rotated with the trommel, lifting and tipping the cases to empty their contents—the bottles. Repeated lifting and dropping of the bottles renders them into crushed glass which falls through the trommel screen. The crushed glass is moved along the conveyors 25, 29 and 31.

As shown in FIGS. 2 and 3, the crushed glass stacker conveyor 35 has a self-supporting frame 61. Axles 63 and wheels 65 may be fixed in positions parallel to the stacker conveyor 35 (FIG. 3) or transverse to the stacking conveyor 35 (FIG. 2). In the latter position as shown in FIG. 2, the stacking conveyor 35 may be moved radially around a pivot point 67 to direct the output of the stacker conveyor 35 to different glass bins. The broken glass fragments fall from the conveyor extension 31 into the bin 33 at the bottom of the conveyor 35, and are carried by the conveyor 35 over the distal end 71 into the desired glass fragment bin for recycling.

The entire equipment may be moved quickly into a building or yard of a major source of returned cased bottles. For example, a beer distributor or brewer has a fleet of trucks which pick up and return empty bottles in cases when delivering full cases to retailers. A pasteboard box crusher, bins for receiving broken glass fragments, and bins for carrying away the collapsed pasteboard and cardboard are all that the distributor or brewer needs to complete its recycling operations.

The bins may be rail cars or standard roll-on roll-off bins for shipping the glass fragments and compressed packaging materials to glass plants and paper mills.

While the invention has been described with reference to specific embodiments, modifications and variations of the invention may be constructed without departing from the scope of the invention.

I claim:

1. A method of decasing, breaking and separating bottles and cases comprising providing the bottles and cases in a hopper, conveying the bottles and cases from the hopper to a trommel by a feeder, lifting, tipping and separating the bottles and the cases by lifting tubes in the rotating trommel and by gravity, repeating the trommel movement thereby fragmenting the bottles and forming fragmented material, separating the fragmented material via a screen in the trommel, conveying the fragmented material through a bottom of the trommel, and moving the emptied cases to an overs stacker.

2. The method of claim 1, further comprising separating the cases from the bottle in the trommel, moving the cases to a overs stacker conveyor at a rear end of the trommel.

3. The method of claim 1, further comprising supplying the cases to a compression device, flattening the cases in the compression device and removing and recycling the cases.

4. The method of claim 2, further comprising collecting the fragmented material in a trough below the trommel.

5. The method of claim 4, further comprising conveying the fragmented material from the trough to a chute by means of a conveyor.

6. The method of claim 5, further comprising transferring the fragmented material from the chute to an extension communicating with the conveyor.

7. The method of claim 6, further comprising filling bins with the fragmented material from the conveyor through a hopper.

8. The method of claim 6, further comprising pivotably connecting the extension to the conveyor for moving the extension along an arc and filling different bins.

9. The method of claim 6, further comprising filling bins with the fragmented material and transporting the bins to recycling units.

10. A decasing and glass recovery method comprising breaking glass bottles and separating glass from cases by receiving bottles encased in cases in a hopper, rotating a trommel, feeding the bottles and cases to a receiving end of the trommel with a feeder connecting the hopper and the trommel, lifting and turning the cases, emptying the bottles from the cases with the trommel as the trommel rotates, separating the bottles from the cases by dropping, breaking and fragmenting the bottles, against the trommel, screening the broken and fragmented bottles through the trommel, receiving the separated, broken fragmented bottles on a conveyor beneath the trommel, conveying the received separated, broken and fragmented bottles from beneath the trommel with the conveyor to at least one chute and directing the separated, broken and fragmented bottles with the at least one chute to a glass recovery container, passing the emptied cases through the trommel and out through an exit end of the trommel and conveying the emptied cases away from the exit end of the trommel.

11. The method of claim 10, further comprising tilting the trommel downward between the receiving end and exit end of the trommel, and wherein the feeding comprises feeding the encased bottles through at least one opening in the receiving end for receiving the bottles and cases from the hopper and the conveyor and wherein the passing of the emptied cases comprises passing the emptied cases through at least one outlet at the exit end of the trommel.

12. The method of claim 11, wherein the conveying the emptied cases away further comprises transporting the cases from the exit end of the trommel with an overs stacker-conveyor and receiving and deforming the emptied cases with a compressor connected to the stacker-conveyor.

13. The method of claim 10, wherein the lifting and turning further comprises lifting, tipping and tumbling the cases and the bottles with lifting tubes in the trommel.

14. The method of claim 10, wherein the breaking and fragmenting of the bottles further comprises fragmenting the bottles tumbling in the rotating trommel on screens and moving the cases to upper levels above fragmented glass material in the trommel and wherein the screening comprises flowing the fragmented glass material through the screens.

15. The method of claim 14, wherein the receiving the separated, broken and fragmented bottles further comprises positioning a trough below the screens of the trommel and connecting a lower chute to the trough for receiving the fragmented material from the trommel and supplying the material from the lower chute to the conveyor.

16. The method of claim 15, wherein the directing further comprises communicating at least one extension with the conveyor for supplying the fragmented material from the at least one extension to transport receptacles.

17. The method of claim 16, further comprising pivotably connecting the at least one extension to the conveyor, moving the extension along various points and filling several of the transport receptacles.

18. A decasing and glass recovery method comprising receiving encased glass containers in cases in a hopper, rotating a trommel, feeding the encased glass containers in the cases to the trommel with a feeder connecting the hopper and the trommel, emptying the cases, separating the glass containers from the cases and breaking and fragmenting the glass containers with the trommel, receiving the separated, broken fragmented glass from the glass containers beneath the trommel, conveying the separated, broken and fragmented glass from beneath the trommel to at least one chute and directing the separated, broken and fragmented glass with the at least one chute to a glass recovery container, and conveying the emptied cases away from one end of the trommel.

* * * * *